United States Patent
Reiher

(10) Patent No.: US 8,006,283 B2
(45) Date of Patent: Aug. 23, 2011

(54) METHOD AND SYSTEM FOR TRIGGERING INTERNET APPLICATIONS USING MESSAGES

(75) Inventor: Eric Reiher, Longueuil (CA)

(73) Assignee: SabSe Technologies, Inc., Mountain View, CA (US)

(*) Notice: Subject to any disclaimer, the term of this patent is extended or adjusted under 35 U.S.C. 154(b) by 973 days.

(21) Appl. No.: 11/858,438

(22) Filed: Sep. 20, 2007

(65) Prior Publication Data

US 2008/0072299 A1 Mar. 20, 2008

Related U.S. Application Data

(60) Provisional application No. 60/826,317, filed on Sep. 20, 2006.

(51) Int. Cl.
*H04L 9/32* (2006.01)

(52) U.S. Cl. .................... 726/2; 726/3; 726/4

(58) Field of Classification Search .............. 726/1–5; 713/168, 170; 380/255, 257, 270
See application file for complete search history.

(56) References Cited

U.S. PATENT DOCUMENTS

| 6,320,947 B1 | 11/2001 | Joyce et al. |
| 6,587,836 B1 | 7/2003 | Ahlberg et al. |
| 6,791,974 B1 * | 9/2004 | Greenberg ............ 370/352 |
| 6,868,544 B2 * | 3/2005 | Dalal et al. ............ 719/318 |
| 2005/0198173 A1 | 9/2005 | Evans |
| 2005/0235148 A1 | 10/2005 | Scheidt et al. |
| 2006/0177030 A1 | 8/2006 | Rajagopalan et al. |
| 2006/0183489 A1 | 8/2006 | Modeo |
| 2006/0272011 A1 | 11/2006 | Ide et al. |
| 2007/0180504 A1 | 8/2007 | Hung |
| 2007/0209065 A1 | 9/2007 | Branam et al. |

FOREIGN PATENT DOCUMENTS

| WO | WO 02/093959 | 11/2002 |
| WO | WO 03/073240 | 9/2003 |
| WO | WO 2004/031902 | 4/2004 |
| WO | WO 2004/049615 | 6/2004 |
| WO | WO 2007/012083 | 1/2007 |
| WO | WO 2007/068098 | 6/2007 |

OTHER PUBLICATIONS

PCT/Notification of transmittal of the International Search Report (ISR) and the Written Opinion of the International Searching Authority,or the Declaration—PCT/CA2007/001688 (Form PCT/ISA/220)—May 23, 2008—3 pages.
PCT/International Search Report (ISR)—PCT/CA2007/001688 (Form PCT/ISA/210)—May 23, 2008—14 pages.

* cited by examiner

*Primary Examiner* — Hosuk Song
(74) *Attorney, Agent, or Firm* — Lethrop & Gage LLP

(57) ABSTRACT

There is described a system and a method for triggering an Internet application from an Internet-enabled computing device having access to information specific to a user, namely user-specific information. The Internet-enabled computing device being for coupling to a network, and the method comprising: receiving a message from the user via the network, the message having associated thereto user identification; comparing the user identification with the user-specific information; validating the user identification using the comparison; and upon positive validation, triggering the Internet application from the Internet-enabled computing device using the received message.

20 Claims, 3 Drawing Sheets

METHOD AND SYSTEM FOR TRIGGERING INTERNET APPLICATIONS USING MESSAGES

CROSS-REFERENCE TO RELATED APPLICATIONS

This patent application claims priority under 35 U.S.C. 119(e) of the U.S. provisional Patent Application No. 60/826,317 entitled "Using short messaging to trigger Internet applications" filed Sep. 20, 2006, which is hereby incorporated by reference.

TECHNICAL FIELD

The description relates generally to telephony services. More specifically, the context is Internet telephony.

BACKGROUND OF THE ART

Certain information stored on a user's computer persistently connected to the Internet, or information from a user's Internet application or any web-based account, may be useful to access in cases where the user is either (a) not near his computer, (b) does not have the ability to access his computer over the Internet (e.g., such as by using peer-to-peer software installed on another computer or on a smart phone), or (c) his computer is closed and the user cannot access web hosted applications using another computer which is Internet-enabled.

Accordingly, there is a need for improved Internet telephony services.

SUMMARY

The present system and method allows the user to trigger applications running on his computer, or applications hosted on a network server via any messaging means in order to access various information such as information stored on his computer or information from a web-based account stored somewhere on the internet.

According to an embodiment, the present description describes a method for triggering an Internet application from an Internet-enabled computing device having access to information specific to a user, namely user-specific information. The Internet-enabled computing device for coupling to a network, the method comprising: receiving a message from the user via the network, the message having associated thereto user identification; comparing the user identification with the user-specific information; validating the user identification using the comparison; and upon positive validation, triggering the Internet application from the Internet-enabled computing device using the received message.

According to another embodiment, the present description also describes a system for triggering an Internet application using a message sent by a user over a network, the message having associated thereto user identification. The system comprises: an input for receiving the message sent by the user via the network; a database for storing information specific to the user, namely user-specific information; and an Internet-enabled computing device for comparing the user identification associated with the message with the user-specific information; for validating the user identification using the comparison; and, upon positive validation, for triggering the Internet application from the Internet-enabled computing device using the message.

According to another embodiment, the present description describes a system for triggering Internet applications. The system comprises: a server coupled to a network; a database accessible by the server for storing information specific to a user, namely user-specific information; and an application coupled to the server. The application configured for: receiving a message from the user via the network, the message having associated thereto user identification; comparing the user identification with the user-specific information; validating the user identification using the comparison; and upon positive validation, triggering the Internet application from the server using the received message.

Further details of these and other aspects will be apparent from the detailed description and figures included below.

DESCRIPTION OF THE DRAWINGS

Reference is now made to the accompanying Figures depicting aspects of the present description, in which.

It will be noted that throughout the appended drawings, like features are identified by like reference numerals.

DETAILED DESCRIPTION

Figure 1:
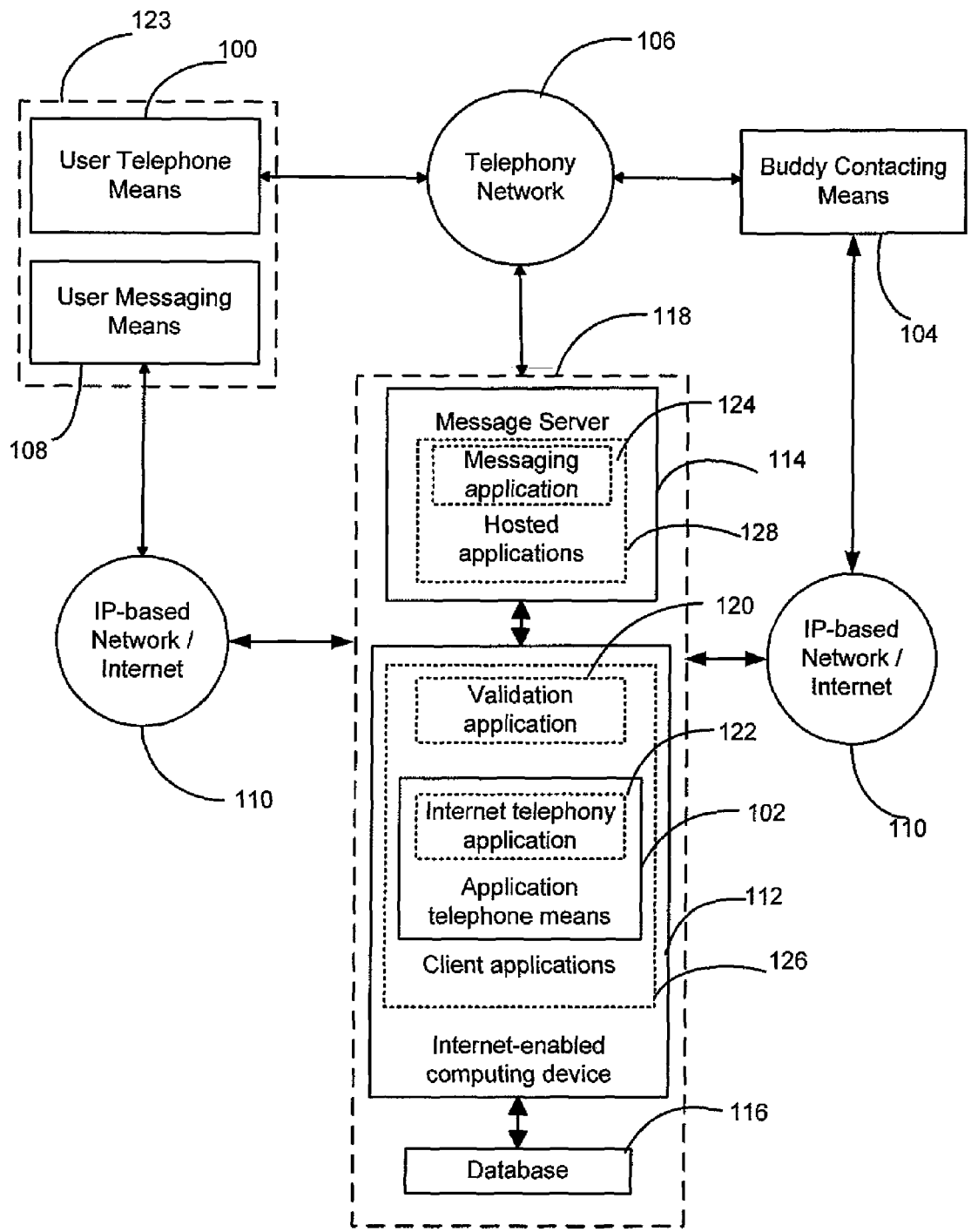
FIG. 1 is a block diagram providing an overview of the environment in which embodiments of a system and method for triggering applications on a remote computing device are implemented.

Turning to FIG. 1, there is shown a contacting means 123 which may be linked to system 118 and to a buddy contacting means 104 through one of a telephony network 106 and an Internet Protocol (IP)-based network 110 or a combination thereof.

System 118 is shown to have an Internet-enabled computing device 112, a message server 114 and a database 116.

The Internet-enabled computing device 112 stores and executes an application telephone means 102 along with validation application 120 and other client applications 126. The message server 114 hosts a messaging application 124 and other optional hosted applications 128. The message server 114 has the ability to interpret and route received messages appropriately throughout the networks.

Buddy contacting means 104 can be a telephone means with or without access to IP-based network 110, a messaging means, or any other contacting means having access at least to telephone network 106.

The links between user contacting means 123, application telephone means 102 and buddy contacting means 104 can be wire-based or wireless.

Network 106 can be any type of network adapted to communicate with user telephone means 100, buddy contacting means 104 and application telephone means 102, such as a Wireless telephone network, a Public Switched Telephone Network (PSTN), or any combination of the two. Network 106 has a modem and a short message service (SMS) or multimedia message service (MMS) aggregator (not shown).

In FIG. 1, user contacting means 123 has a user telephone means 100 and a user messaging means 108. The skilled addressee will appreciate the fact that the user telephone means 100 and the user messaging means 108 may or may not be comprised in one component, which is the user contacting means 123. For example, user contacting means 123 may be a mobile phone which is both Internet-enabled and capable of sending text messages via the short message service (SMS) or the multimedia message service (MMS) provided by telephony network 106, or emails or web-based messages via a web-based application. In another embodiment, user messaging means 108 is a computing device which has access to the IP-based network 100 and thus has the capability of sending text messages such as emails over network 110. If such a device can be reachable through a "voice over IP" (VoIP) telephone number (such as "Skype In"), it can also be reachable by application telephone means 102 for call back purposes, as detailed below. Alternatively, a separate user telephone means 100 is associated to a user for calling back the user.

Internet-enabled computing device 112 is in communication with IP-based network 110 (e.g. the Internet) and can be any Internet-enabled appliance such as a wireless device using WiFi, Worldwide Interoperability for Microwave Access (WiMax) or any other wireless communications technology. In an embodiment, Internet-enabled computing device 112 is a user's computing device (desktop or laptop) which has a persistent connection to the IP-based network 110 through any type of connection or other network such as a digital subscriber line (DSL) link or a local or wide area network (LAN/WAN).

Database 116 is for storing user-specific information, such as account credentials for a web-based account, or a ".PST" file for use in Microsoft Outlook. Such user-specific information can alternatively be stored in a memory device (not shown) in the Internet-enabled computing device 112.

The person skilled in the art will appreciate that it is not essential for Internet-enabled computing device 112, application telephone means 102, message server 114 and database 116 to be embodied in a single machine or even in a single location. The components of system 118 can thus be in various machines or in various locations and communicate via any one of network 106 and 110 or a combination thereof.

In an embodiment, application telephone means 102 has an Internet telephone application 122 installed on Internet-enabled computing device 112. The skilled addressee will appreciate the fact that if message server 114 is separate from computing device 112, the message server 114 may then have its own telephone means similar to the application telephone means 102.

Internet telephony application 122 has the ability to establish "Voice Over Internet Protocol" (VoIP) telephone calls from a point in IP-based network 110. The Internet-enabled computing device 112 in turn has the ability to receive and establish phone calls as handled by the Internet telephony application 122.

According to an embodiment, the message sent by the user from the user contacting means 123 has associated thereto user identification information. The user identification information can be a user phone number, a user identification number, a user name or any other type of user identification information such as a user's email address or the Internet address of the user's Internet-enabled computing device 112.

The user identification information is either contained within the message itself or associated to the message. For example, an attachment file or a separately sent identifying message having a link to the message can serve as identification information.

Alternatively, a calling line identification (CLID) information function associated with an incoming message can be used to establish the identity of the user and thus the user identification information. For example, if the user employs user telephone means 100 to send a text message via an SMS or MMS service over telephony network 106, the message may have associated CLID information.

According to an embodiment, the system can be used to trigger Internet applications such as Internet telephony application 122, client applications 126, and hosted applications 128 as described below.

In the case where message server 114 is separate from Internet-enabled computing device 112, the user sends a message to coordinates associated to the message server 114, such as a designated telephone number or a network address, and message server 114 then communicates with Internet-enabled computing device 112 via the network 110.

Alternatively, remote Internet-enabled computing device 112 is directly addressed. A non-limiting example of coordinates of Internet-enabled computing device 112 is a designated telephone number associated to the user's Internet-enabled computing device 112 VoIP number (e.g., "Skype-in" when the Internet telephony software is Skype).

Once a message initially arrives at one of the message server 114 and the computing device 112, the user who sent the message is identified from the user information associated to or contained in the message. If the message server 114 receives the message beforehand, a network address of the Internet-enabled computing device 112 of the user is retrieved, from database 116, using the user identification information. The message server 114 can also simply recognize the Internet address of the users Internet-enabled computing device 112 in the message. The address of the Internet-enabled computing device 112 enables the establishment of a communication between the message server 114 and the Internet-enabled computing device 112.

A validation, registration and authorization process may then follow to permit the user to access the Internet-enabled computing device 112 and trigger any of the Internet applications running on the Internet-enabled computing device 112.

Validation application 120 allows the identification of a user and allows a validated user to access information available on the Internet-enabled computing device 112, and to access and trigger applications running on the user's computer 112 by sending a message from user contacting means 123.

In an example, validation application 120 runs on the Internet-enabled computing device 112. In another non-limiting example where the Internet-enabled computing device 112 and the message server 114 are within one device, the validation application 120 can be installed together with the Internet telephony application 122 (e.g., Skype) and the messaging application 124 on the user's Internet-enabled computing device 112.

The user sending the message can be identified and validated using various scheme.

In accordance with an embodiment, a user first registers an association between that user, the Internet address of the user's Internet-enabled computing device 112 and a specific telephone number (or plurality of telephone numbers) that the user expects to use for sending messages through a messaging service such as SMS or MMS, for receiving a call back, or for placing a call to a buddy (such as the telephone number of a user telephone means 100 which is to be used in placing a call to the buddy contacting means 104). It is therefore understood that a user can set up a plurality of user telephone means 100 even though it is not shown as such in FIG. 1. Such registered information can form user-specific information stored in database 116 or in a memory device accessible to Internet-enabled computing device 112 and applications 120 and 122. Optionally, other authentication credentials (e.g., password or PIN) may also be stored in database 116 or in any other memory device employed by Internet-enabled computing device 112 (not shown).

If the message is sent over the telephony network 106 and a CLID function is available, the message may have associated CLID information. In such a case, the CLID information serves as user identification information and is compared to stored CLID information of the user. The stored CLID information of the user is user-specific information and pertains to pre-registered telephone identification likely or expected to be used by the user to send the message.

The validation application 120 can also intervene and recognize that the user has designated the Internet address of his or her own Internet-enabled computing device 112 in the message. An additional authentication step may then be provided to confirm the identity of the user and to ensure that further access is permitted.

In any case, the validation application 120 compares the user identification information to the stored user-specific information. The results of the comparison are then used to determine whether the user sending the message is an authorized user.

At this point, an authorized user is optionally automatically "logged in" to the computing device 112. In a first non-limiting example, the authorized user can trigger a local application (e.g., Microsoft Outlook, MSN Messenger, etc. not shown) that utilizes user-specific information locally stored in database 116 or any other memory device (not shown) dedicated to the computing device 112. In a second non-limiting example, validation application 120 triggers the opening of an Internet session (e.g., Yahoo voice, Hotmail, etc.) with a target web site. The validation application 120 accesses the account credentials associated with the authorized user and transfers them to the web site, thus allowing the authorized user to gain access (i.e., log in) to an Internet-accessible account via the web site.

In some embodiments, despite recognition of the user identification information associated to the message sent by the authorized user, the user may nevertheless be asked to authenticate himself/herself by providing other authenticating information such as a password or PIN, as stored in database 116 for example.

For additional security, when the password is used for an Internet application such as Skype, it is possible to avoid keeping the password in any database or on any device. The password is interactively asked to the user when needed and passed directly to the application login along with his user name. If the application logs in with no password error, it is thus verified that the user entered the correct password and is valid.

If the user identification information associated with the received user message corresponds to a telephone number or information which is not found in database 116 or in a memory of Internet-enabled computing device 112 (not shown), then there is no automatic user login. Rather, the user which sent the message may be prompted to enter certain additional credentials.

Thus, the user may trigger Internet-related applications running on a user's Internet-enabled computing device 112, such as Internet voice mail and email, by using any regular messaging device. From then on, the user can gain access to information stored on a server such as message server 114 or on the Internet-enabled computing device 112 and initiate other client applications such as Internet telephony 122.

The following provides an example of how an authorized user can set up a communication with a buddy contacting means 104.

Once message server 114 recognizes the designated network or Internet-address of Internet-enabled computing device 112 and the user is authorized and/or logged-in, a data communication path is established between message server 114 and client applications 128 running on Internet-enabled computing device 112. A message is sent from message server 114 to Internet-enabled computing device 112 using instant messaging applications for example. This message contains an identification of a Buddy the user wants to contact as specified by the original message sent by the user from the user contacting means 123.

The skilled addressee will appreciate that other forms of data communication paths can be used to send information from message server 114 to Internet-enabled computing device 112. These may include the transmission of an email message or employ a web application to send a chat message for example. It is also appreciated that the Buddy identification information can be a Buddy user name, coordinates of a Buddy, a telephone number of a Buddy, an email address of a Buddy, or any other form of information that is associated to a Buddy.

Once Internet-enabled computing device 112 receives the message or any other from of data communication path initiator, Internet-enabled computing device 112 extracts from the message or the initiator, the Buddy identification information to be contacted.

Alternatively, the Buddy identification information is extracted from the original message sent by the user. This can be the case when message server 114 and Internet-enabled computing device 112 are embodied in a single component or are both simultaneously addressable.

If a message sent by a user does not have the Buddy identification information but yet requests a call to be placed to a Buddy, the system prompts the user to input Buddy identification information such as a name of a Buddy or coordinates of a Buddy using an interactive prompting device of the system.

With the Buddy coordinates, Internet-enabled computing device 112 can determine, based on a directory, how to contact the Buddy and whether the Buddy is online.

For example, the Buddy identification information can be associated with Buddy coordinates such as a telephone number of a Buddy contacting means. The user therefore does not need to identify the telephone number or a specific coordinate of the Buddy in the message, any Buddy identification information suffice.

Internet-enabled computing device 112 then "calls back" the user telephone means 100 associated to the user using application telephone means 102. The call-back number can be retrieved from the CLID information or can be a telephone number specified by the user upon user registration. The call-back number can also optionally be a default number stored in a memory device of internet-enabled computing device 112, and retrieved upon login of the user or upon establishing the data communication path between the message server 114 and the Internet-enabled computing device 112. The default number can be a PSTN telephone number even though the initial message is sent via a user telephone means which is a mobile phone for example. Finally, a plurality of call-back numbers can also be dialed in sequence or in parallel in order to reach the user.

Internet-enabled computing device 112 optionally sets up a conference with the user telephone means 100 and the Buddy contacting means 104. The Internet-enabled computing device 112 can remain in the conference and allows for the user to communicate with the Buddy specified in the message. The call can thus be placed while the user continues to interact with the client applications running on Internet-enabled computing device 112. The user can thus create new calling functions via Internet-enabled computing device 112, such as dynamic conferences, voice mail, call transfers, call on hold or any other calling function supported by Internet-enabled computing device 112.

It will be appreciated that the system and method described herein can be useful when the user's wireless carrier or provider offers free (or advantageously priced) incoming calls, and where the user subscribes to SMS/MMS services and has a persistent Internet connection through Internet-enabled computing device 112.

The system and related method also allows the monitoring of a call placed between the user and the Buddy since the identities of both the user and the Buddy are known by the message server 114. Such monitoring can be for various applications such as for differential billing purposes for example.

In the above description, the message sent by the user can take the form of a specific request. For example, a user can send a message to place a call to the Buddy contacting means 104; to trigger client or hosted applications 126 and 128; to request a status of a Buddy (i.e., to receive a notice indicating the buddy's internet status such as whether the buddy is online, offline, away, busy or any other status as contemplated by a network communication application running on Internet-enabled computing device 112); to request a monitoring of a status of a buddy; to request communication with a buddy who is reachable via any given buddy contacting means 104 other than a telephone means associated with the buddy; or to request that the message being sent be used as a "wake up" call for a customer message.

A message which requests that it be used as a "wake up" call for a customer message specifies a user-defined condition for triggering an Internet application. The user-defined condition can vary according to the user's desires. For example, the condition can be a timing condition whereby the system performs a call back or places a call between the user and the specified Buddy after a user-defined time expiration. The condition can also be more complex and can allow for the user to be put into contact with a Buddy when the Buddy becomes available on the network, and optionally within a user-defined time period. A user is thus able to request various actions of the Internet application, such as receiving a message or a call notification from the system when a Buddy arrives on the network. Once the Buddy is available, the system can then ask the user whether the user wants to call the Buddy or not. The skilled addressee will appreciate the fact that several other kinds of Internet application triggering conditions can be defined by a user in the message.

Also, once the user has access to Internet-enabled computing device 112, client applications 126 running on Internet-enabled computing device 112 can prompt or notify the user. Notifications can be, for example, application errors, user account information such as missed calls, voice emails, a user status or any other Internet account information.

Client applications 126 executing on the Internet-enabled computing device 112 can also serve as a real-time interface and provide an end-to-end communication between the remotely logged-in user and a Buddy, thereby initiating a communication between Buddy contacting means and Internet-enabled computing device 112. The communication in turn permits an exchange of messages between the user's contacting means 123 and the Buddy contacting means 104 over any one of the data network 110 and the telephone network 106.

Figure 2:
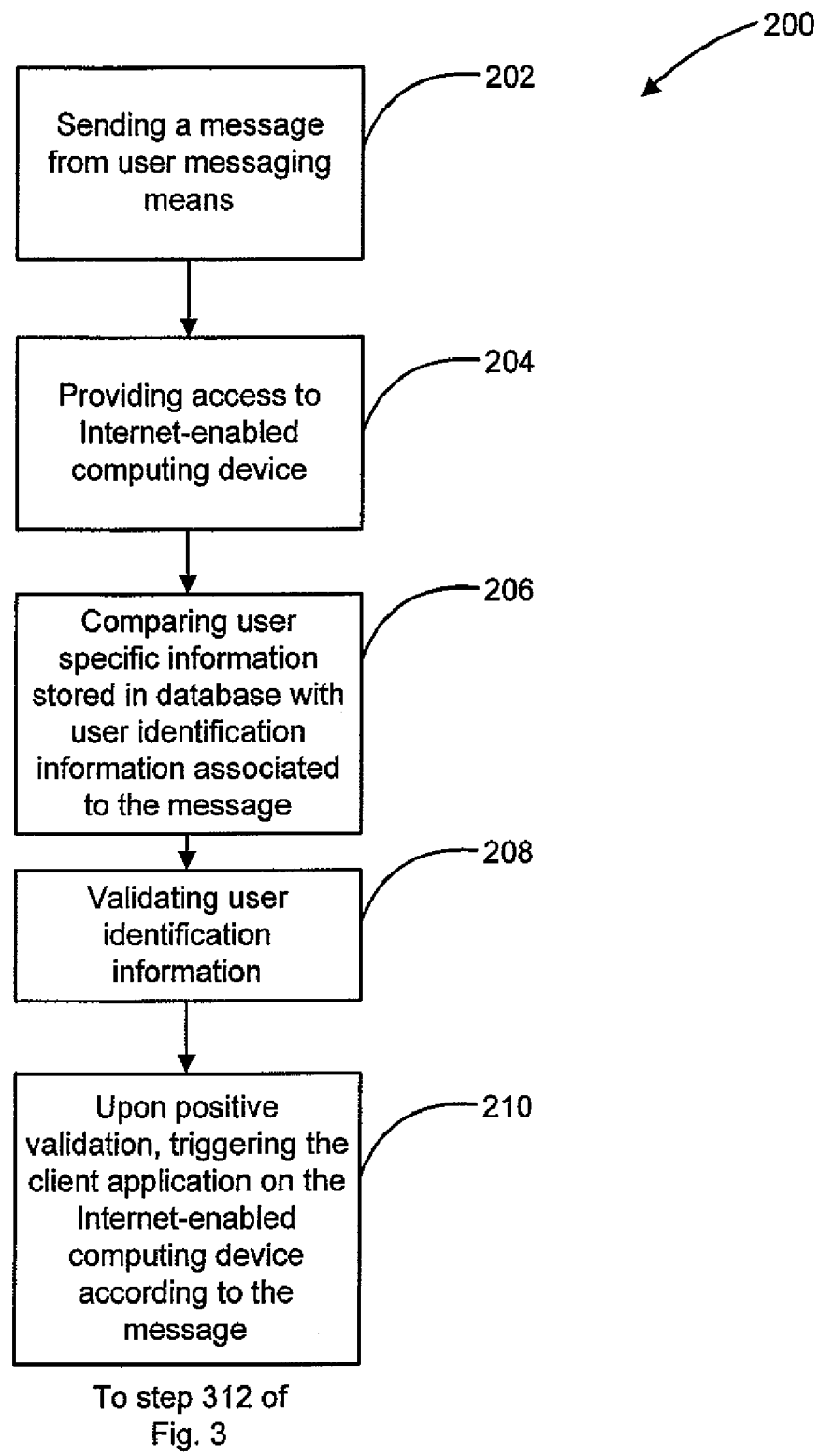
FIG. 2 is a flow chart illustrating an exemplary embodiment of a method for triggering applications on a remote computing device.

Now turning to FIG. 2, there is shown an embodiment of the method 200 for automatically logging in a user to an Internet-enabled computing device. As stated earlier, the Internet-enabled computing device running a validation application and has access to information specific to the user, namely user-specific information.

Method 200 comprises, at step 202, sending a message from messaging means, the message having associated thereto user information. If the messaging means sends messages through telephony network 106, calling line identification (CLID) information may be the user identification information associated to the message. Alternatively, user identification information can be provided by the user in the message or as an attachment to the message.

At step 204, the message server provides access to the internet-enabled computing device. This can be done by sending another intermediate message from a message server which initially received the message to the address of the Internet-enabled computing device, as identified from the user information associated to the message.

At step 206, the validation application, on the Internet-enabled computing device, compares the user identification information associated with the message to the user-specific information stored in a database.

Method 200 further comprises, at step 208, validating the user identification information using the comparison, and, at step 210, upon positive validation, triggering an application running on the Internet-enabled computing device according to the content of the message.

Figure 3:
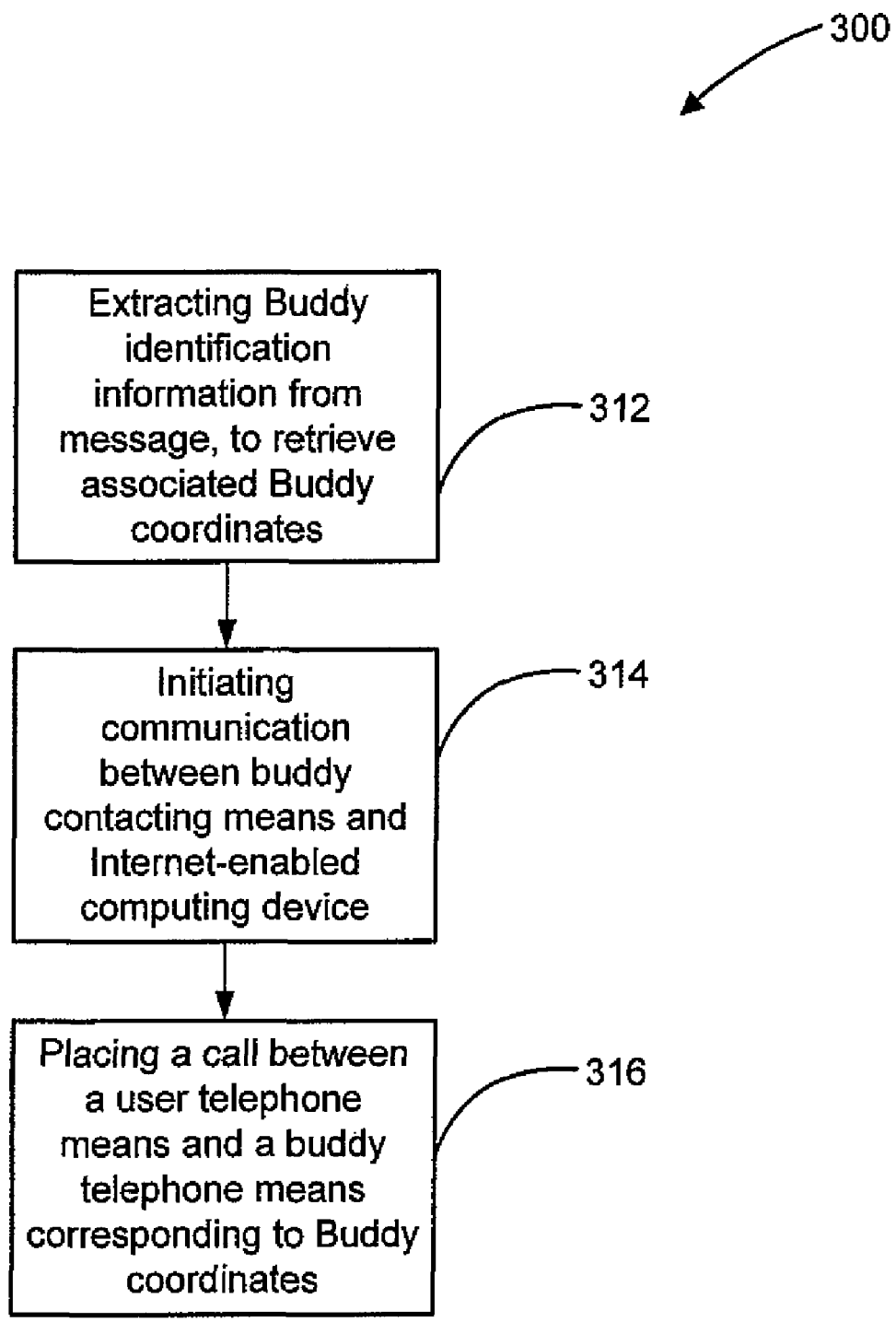
FIG. 3 is a flow chart illustrating additional steps following the exemplary embodiment of the method as in FIG. 2.

Now turning to FIG. 3, there is shown an embodiment of the method 300 for placing a call to a buddy by triggering a calling application on a remote Internet-enabled computing device. In an embodiment, the method 300 starts after step 210 of method 200 illustrated in FIG. 2.

Once the user is logged in at step 210 of method 200, the method 300 comprises, at step 312, extracting identification information of a buddy from the message initially sent by the user or from the intermediate message sent from the message server to the Internet-enabled computing device. The buddy identification information is associated to coordinates of a buddy contacting means and once the buddy identification information is extracted, the coordinates of the buddy are retrieved from a database using the identification information.

At step 314, the method comprises initiating a communication between the buddy contacting means and the Internet-enabled computing device. This is preformed using the coordinates of the buddy contacting means retrieved in the extracting step 312.

At this point, several various requests of the user as sent by the message from user messaging means can be answered. For example, a status of the buddy can be determined and sent back to the user messaging means. An alarm signal can also be sent back to the user messaging means when the buddy sends a message to the Internet-enabled computing device of the user, for example. Other prompting mechanisms and user requests as sent in the message from the user messaging means to the Internet-enabled computing device can also be answered.

In step 316, a call is placed between a user telephone means and a buddy telephone means corresponding to the buddy coordinates. The call can be placed in numerous ways. In one example, a call back is performed such that Internet-enabled computing device calls back the user telephone means and sets up a three-way conference call with the user telephone means and the buddy telephone means. This also allows for the Internet-enabled computing device to monitor the three-way conference call.

The above description is meant to be exemplary only, and one skilled in the art will recognize that changes may be made to the embodiments described without department from the scope of the invention disclosed. Modifications which fall within the scope of the present invention will be apparent to those skilled in the art, in light of a review of this disclosure, and such modifications are intended to fall within the appended claims.

The invention claimed is:

1. A method for triggering an Internet application from an Internet-enabled computing device coupled to a network and having access to user-specific information associated with a sender of a message and identification information of a user contacting means, the method comprising:
   receiving, from the user contacting means via the network, the message having user identification and calling line identification (CLID) information associated therewith;
   comparing the user identification and the CLID information with the user-specific information, using the computing device, to provide user identification validation; and
   upon positive said validation, triggering the Internet application from the computing device.

2. The method of claim 1, wherein a validation application is installed on the Internet-enabled computing device and used in the step of comparing.

3. The method of claim 1, further comprising registering an association between the user and one or more specific telephone numbers associated with a user telephone means that the user expects to use.

4. The method of claim 3, wherein when the CLID information cannot be validated, the method further comprising:
   prompting the user to input authentication credentials; and
   comparing and validating the user-inputted authentication credentials to the registered user authentication credentials.

5. The method of claim 1, the step of triggering further comprising determining Internet account information for the user; and sending the Internet account information back to the user contacting means.

6. The method of claim 1, the step of triggering further comprising:
   extracting identification information for a buddy from the message, the identification information for the buddy being associated with a buddy-contacting means; and
   initiating a communication between the buddy contacting means and the Internet-enabled computing device.

7. The method of claim 6, wherein the triggering further comprises:
   determining a status of the buddy; and
   sending the status to the user contacting means.

8. The method of claim 6, wherein the initiating of the communication comprises placing a call between a user telephone means and a buddy telephone means, the user telephone means being associated with at least one of the user registration information and the user identification information, and the buddy telephone means corresponding to coordinates of the buddy contacting means.

9. The method of claim 8, wherein the placing of the call comprises the Internet-enabled computing device performing at least one of: calling back the user telephone means and setting up a three-way conference call with the user telephone means and the buddy telephone means.

10. The method of claim 1, wherein the triggering comprises opening an Internet session with a target web site.

11. The method of claim 10, wherein the receiving of the message from the user via the network comprises receiving one of: a message via a short message service (SMS) of the network, a message via a multimedia message service (MMS) of the network, an email and a chat message.

12. A system for triggering an Internet application using a message sent over a network, the system comprising:
   a database for storing user-specific information associated with a sender of the message and with a user contacting means;
   an Internet-enabled computing device for comparing and validating (1) user identification associated with the message, and (2) calling line identification (CLID) information associated with the message, with the user-specific information to provide user identification validation, and for, upon positive said validation, triggering the Internet application from the computing device; and
   a message server for receiving the message from the user contacting means and for communicating at least a portion of the message to the computing device.

13. The system of claim 12, wherein the Internet-enabled computing device comprises a validation application, for comparing and validating the user identification with the user-specific information.

14. The system of claim 12, further comprising an input for receiving, prior to receiving the message, user registration information to be stored in the database, the user registration information comprising at least one of: user authentication credentials and the identification information of the user contacting means associated with the user, the user-specific information of the database thereby comprising the user registration information.

15. The system of claim 14, the user registration information further comprising a user-registered association between the user and one or more specific telephone numbers associated with a user telephone means that the user expects to use.

16. The system of claim 12, wherein the Internet-enabled computing device comprises a client application, the client application for:
   extracting Buddy identification information from the message; and
   initiating a communication between a buddy contacting means and the Internet-enabled computing device, the Buddy identification information being associated with coordinates of the Buddy contacting means.

17. The system of claim 16, wherein the Internet-enabled computing device further comprises a client application for determining a status of the buddy and for notifying the user of the status by contacting the user contacting means.

18. The system of claim 16, wherein the Internet-enabled computing device further comprises an application telephone means for placing a call between a user telephone means and a buddy telephone means, the user telephone means being associated with at least one of the user registration information and the user identification information, and the buddy telephone means corresponding to the coordinates of the buddy contacting means.

19. The system of claim 18, wherein the application telephone means comprises an Internet telephony application for calling back the user telephone means and setting up a three-way conference call with the user telephone means and the buddy telephone means.

20. A system for triggering an Internet application using a message sent by a user over a network, the message having user identification and calling line identification (CLID) information associated therewith, the system comprising:
- a server coupled to the network;
- a database accessible by the server for storing user-specific information of the user; and
- an application coupled to the server, the application configured for:
  - receiving the message;
  - comparing the user identification in the message with the user-specific information to provide user validation; and
  - upon positive said validation, triggering the Internet application from the server using the received message.

* * * * *